United States Patent
Bu et al.

(10) Patent No.: US 10,133,863 B2
(45) Date of Patent: Nov. 20, 2018

(54) ZERO-DAY DISCOVERY SYSTEM

(71) Applicant: FireEye, Inc., Milpitas, CA (US)

(72) Inventors: Zheng Bu, Fremont, CA (US); Yichong Lin, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 286 days.

(21) Appl. No.: 13/925,688

(22) Filed: Jun. 24, 2013

(65) Prior Publication Data

US 2014/0380473 A1    Dec. 25, 2014

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/53* | (2013.01) |
| *G06F 21/56* | (2013.01) |

(52) U.S. Cl.
CPC ............ *G06F 21/53* (2013.01); *G06F 21/566* (2013.01); *G06F 21/567* (2013.01)

(58) Field of Classification Search
CPC . H04L 63/1433; H04L 63/14; H04L 63/1408; H04L 63/1416; G06F 21/53; G06F 21/577; G06F 21/566; G06F 21/56; G06F 21/561; G06F 21/567
USPC ..................................................... 726/22–25
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |

(Continued)

FOREIGN PATENT DOCUMENTS

| | | |
|---|---|---|
| GB | 2439806 | 1/2008 |
| GB | 2490431 A | 10/2012 |

(Continued)

OTHER PUBLICATIONS

Gregg Keizer, Microsoft's HoneyMonkeys Show Patching Windows Works, Aug. 8, 2005.*

(Continued)

*Primary Examiner* — Trong H Nguyen

(74) *Attorney, Agent, or Firm* — Rutan & Tucker, LLP

(57) ABSTRACT

A method for determining a zero-day attack by an electronic device is described. According to one embodiment, the method comprises instantiating, by the electronic device, at least one virtual machine, the at least one virtual machine being based on a fortified software profile. The method further comprises executing content capable of behaving as an exploit on the at least one virtual machine, and determining that the exploit is associated with zero-day exploit when the exploit, upon execution of the content on the at least one virtual machine, performs an undesired behavior.

44 Claims, 9 Drawing Sheets

(56) References Cited

U.S. PATENT DOCUMENTS

| | | |
|---|---|---|
| 6,272,641 B1 | 8/2001 | Ji |
| 6,279,113 B1 | 8/2001 | Vaidya |
| 6,298,445 B1 | 10/2001 | Shostack |
| 6,357,008 B1 | 3/2002 | Nachenberg |
| 6,417,774 B1 | 7/2002 | Hibbs et al. |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Benett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dahdia et al. |
| 8,584,234 B1 | 11/2013 | Sobel et al. |

(56) References Cited

U.S. PATENT DOCUMENTS

| | | |
|---|---|---|
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,225,740 B1 | 12/2015 | Ismael et al. |
| 9,233,972 B2 | 1/2016 | Itov et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0157662 A1 | 6/2005 | Bingham et al. |
| 2005/0149726 A1 | 7/2005 | Joshi et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |

(56) References Cited

U.S. PATENT DOCUMENTS

| | | |
|---|---|---|
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1* | 7/2007 | Gribble et al. ............... 726/24 |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1* | 9/2007 | Wang et al. ............... 709/217 |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | German et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1* | 9/2009 | Todd et al. ............... 726/23 |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Shin'ya |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |

(56) References Cited

U.S. PATENT DOCUMENTS

| | | |
|---|---|---|
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181975 A1* | 6/2014 | Spernow .............. G06F 21/562 726/23 |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0096025 A1 | 4/2015 | Ismael |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012145066 | 10/2012 |
| WO | 2013/067505 A1 | 5/2013 |

OTHER PUBLICATIONS

IEEE Xplore Digital Library Sear Results for "detection of unknown computer worms". Http//ieeexplore.ieee.org/searchresult.jsp?SortField=Score&SortOrder=desc&ResultC . . . , (Accessed on Aug. 28, 2009).

AltaVista Advanced Search Results. "Event Orchestrator". Http://www.altavista.com/web/results?Itag=ody&pg=aq&aqmode=aqa=Event+Orchesrator . . . , (Accessed on Sep. 3, 2009).

AltaVista Advanced Search Results. "attack vector identifier". Http://www.altavista.com/web/results?Itag=ody&pg=aq&aqmode=aqa=Event+Orchestrator . . . , (Accessed on Sep. 15, 2009).

Cisco, *Configuring the Catalyst Switched Port Analyzer (SPAN)* ("Cisco"),(1992-2003).

Reiner Sailer, Enriquillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer").

Excerpt regarding First Printing Date for Merike Kaeo, *Designing Network Security* ("Kaeo"), (2005).

*The Sniffers's Guide to Raw Traffic* available at: yuba.stanford.edu/~casado/pcap/section1.html, (Jan. 6, 2014).

"Network Security: NetDetector—Network Intrusion Forensic System (NIFS) Whitepaper", ("*NetDetector Whitepaper*"), (2003).

"Packet", *Microsoft Computer Dictionary*, Microsoft Press, (Mar. 2002), 1 page.

"When Virtual is Better Than Real", *IEEEXplore Digital Library*, available at, http://ieeexplore.ieee.org/xpl/articleDetails.jsp?reload=true&arnumber=990073, (Dec. 7, 2013).

Abdullah, et al., *Visualizing Network Data for Intrusion Detection*, 2005 IEEE Workshop on Information Assurance and Security, pp. 100-108.

Adetoye, Adedayo, et al., "Network Intrusion Detection & Response System", ("Adetoye"), (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", *Springer-verlag Berlin Heidelberg*, (2006), pp. 165-184.

Bayer, et al., "Dynamic Analysis of Malicious Code", *J Comput Virol*, Springer-Verlag, France., (2006), pp. 67-77.

Boubalos, Chris , "Extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.

Cohen, M.I. , "PyFlag—An advanced network forensic framework", *Digital investigation 5*, Elsevier, (2008), pp. S112-S120.

Costa, M. , et al., "Vigilante: End-to-End Containment of Internet Worms", *SOSP '05, Association for Computing Machinery, Inc.*, Brighton U.K., (Oct. 23-26, 2005).

Crandall, J.R. , et al., "Minos:Control Data Attack Prevention Orthogonal to Memory Model", *37th International Symposium on Microarchitecture*, Portland, Oregon, (Dec. 2004).

Deutsch, P. , "Zlib compressed data format specification version 3.3" RFC 1950, (1996).

Distler, "Malware Analysis: An Introduction", *SANS Institute InfoSec Reading Room*, SANS Institute, (2007).

Dunlap, George W. , et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).

Filiol, Eric , et al., "Combinatorial Optimisation of Worm Propagation on an Unknown Network", International Journal of Computer Science 2.2 (2007).

Goel, et al., *Reconstructing System State for Intrusion Analysis, Apr. 2008 SIGOPS Operating Systems Review*, vol. 42 Issue 3, pp. 21-28.

Hjelmvik, Erik , "Passive Network Security Analysis with NetworkMiner", *(In)Secure*, Issue 18, (Oct. 2008), pp. 1-100.

Kaeo, Merike , "Designing Network Security", ("Kaeo"), (Nov. 2003).

Kim, H. , et al., "Autograph: Toward Automated, Distributed Worm Signature Detection", *Proceedings of the 13th Usenix Security Symposium (Security 2004)*, San Diego, (Aug. 2004), pp. 271-286.

(56) References Cited

OTHER PUBLICATIONS

Krasnyansky, Max, et al., *Universal TUN/TAP driver*, available at https://www.kernel.org/doc/Documentation/networking/tuntap.txt (2002) ("Krasnyansky").
Kreibich, C., et al., "Honeycomb-Creating Intrusion Detection Signatures Using Honeypots", *2nd Workshop on Hot Topics in Networks (HotNets-11)*, Boston, USA, (2003).
Kristoff, J., "Botnets, Detection and Mitigation: DNS-Based Techniques", *NU Security Day*, (2005), 23 pages.
Liljenstam, Michael, et al., "Simulating Realistic Network Traffic for Worm Warning System Design and Testing", *Institute for Security Technology studies, Dartmouth College*, ("Liljenstam"), (Oct. 27, 2003).
Marchette, David J., "Computer Intrusion Detection and Network Monitoring: A Statistical Viewpoint", "Marchette", (2001).
Margolis, P.E., "Random House Webster's 'Computer & Internet Dictionary 3rd Edition'", ISBN 0375703519, (Dec. 1998).
Moore, D., et al., "Internet Quarantine: Requirements for Containing Self-Propagating Code", *INFOCOM*, vol. 3, (Mar. 30-Apr. 3, 2003), pp. 1901-1910.
Morales, Jose A., et al., ""Analyzing and exploiting network behaviors of malware."", *Security and Privacy in Communication Networks*. Springer Berlin Heidelberg, 2010. 20-34.
Natvig, Kurt, "SandboxII: Internet", *Virus Bulletin Conference*, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", *In Proceedings of the 12th Annual Network and Distributed System Security, Symposium (NDSS '05)*, (Feb. 2005).
Newsome, J., et al., "Polygraph: Automatically Generating Signatures for Polymorphic Worms", *In Proceedings of the IEEE Symposium on Security and Privacy*, (May 2005).
Nojiri, D., et al., "Cooperation Response Strategies for Large Scale Attack Mitigation", *DARPA Information Survivability Conference and Exposition*, vol. 1, (Apr. 22-24, 2003), pp. 293-302.
Silicon Defense, "Worm Containment in the Internal Network", (Mar. 2003), pp. 1-25.
Singh, S., et al., "Automated Worm Fingerprinting", *Proceedings of the ACM/USENIX Symposium on Operating System Design and Implementation*, San Francisco, California, (Dec. 2004).
Spitzner, Lance, "Honeypots: Tracking Hackers", ("Spizner"), (Sep. 17, 2002).
Thomas H. Ptacek, and Timothy N. Newsham "Insertion, Evasion, and Denial of Service: Eluding Network Intrusion Detection", *Secure Networks*, ("Ptacek"), (Jan. 1998).
Venezia, Paul, "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
PCT/US2014/043726 filed Jun. 23, 2014 International Search Report and Written Opinion dated Oct. 9, 2014.
Adobe Systems Incorporated, "PDF 32000-1:2008, Document management—Portable document format—Part1:PDF 1.7", First Edition, Jul. 1, 2008, 756 pages.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Cisco "Intrusion Prevention for the Cisco ASA 5500-x Series" Data Sheet (2012).
Clark, John, Sylvian Leblanc,and Scott Knight. "Risks associated with usb hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12-final107.pdf [retrieved on Dec. 15, 2014].
Mori, Detecting Unknown Computer Viruses, 2004, Springer-Verlag Berlin Heidelberg.
Oberheide et al., CloudAV.sub.--N-Version Antivirus in the Network Cloud, 17th USENIX Security Symposium USENIX Security '08 Jul. 28-Aug. 1, 2008 San Jose, CA.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
Chen, P. M. and Noble, B. D., "When Virtual is Better Than Real, Department of Electrical Engineering and Computer Science", University of Michigan ("Chen") (2001).
King, Samuel T., et al., "Operating System Support for Virtual Machines", ("King") (2003).

\* cited by examiner

ZERO-DAY DISCOVERY SYSTEM

FIELD

Embodiments of the disclosure relate to the field of data security. More specifically, one embodiment of the disclosure relates to a system, apparatus and method that enhances detection of zero-day attacks.

GENERAL BACKGROUND

Over the last decade, malicious software (malware) attacks have become a pervasive problem for Internet users and enterprise network administrators. In most situations, malware is a program or file that is embedded within downloadable content and designed to adversely influence, undermine, disrupt, alter or otherwise attack normal operations of an electronic device (e.g. computer, tablet, smartphone, server, router, wearable technology, or other types of products with data processing capability). Examples of different types of malware may include bots, computer viruses, worms, Trojan horses, spyware, adware, or any other programming that operates within an electronic device without permission by the user or a system administrator.

For instance, content may be embedded with objects associated with a web page hosted by a malicious web site. By downloading this content, malware may be received as imbedded objects. For example, malware may caused another web page to be requested from a malicious web site may be unknowingly installed on the computer. Similarly, malware may also be installed on a computer upon receipt or opening of an electronic mail (email) message. As an example, an email message may contain an attachment, such as a Portable Document Format (PDF) document, with embedded executable malware. Also, malware may exist in files infected through any of a variety of attack vectors, which are uploaded from an infected computer onto a networked storage device such as a file share.

Over the past few years, various types of security appliances have been deployed within an enterprise network in order to detect behaviors that signal the presence of malware. Often, conventional security appliances are not capable of detecting zero-day attacks. A "zero-day" attack typically poses the greatest threat to an enterprise network as these types of attacks are designed to exploit a previously unknown vulnerability within software executing on one or more targeted electronic devices, and often constitutes a previously unseen type of malware.

As a result, due to difficulties in detecting zero-day attacks by conventional security appliances, customers, software developers and the public at large do not receive warnings regarding detected zero-day threats in an expeditious manner.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
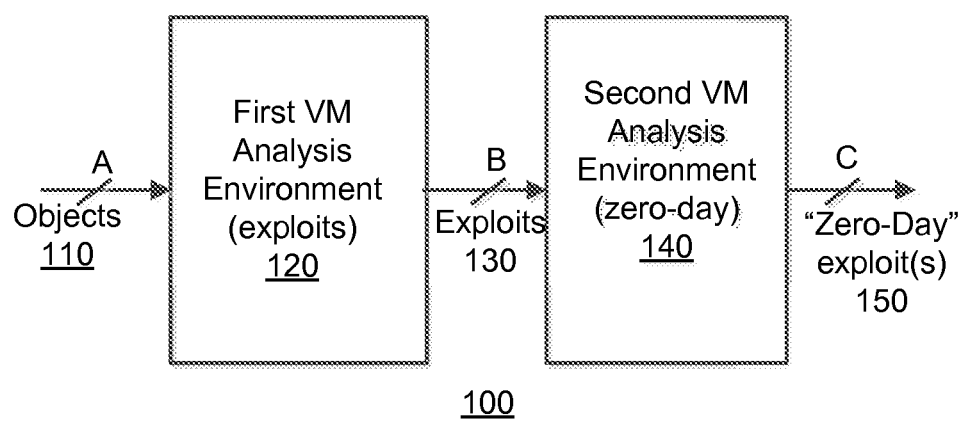
FIG. 1 is an exemplary block diagram of zero-day detection operations performed by virtual machine (VM) environments.

Various embodiments of the disclosure relate to a system and an optimized method for detecting zero-day attacks. One embodiment of the disclosure is directed to provisioning one or more virtual machines (VM(s)), which are based on one or more software profiles and configured for zero-day attack detection. This configuration may be accomplished by the software profile(s) identifying "fortified" software for execution within the VM(s). "Fortified software" includes software, such as an operating system and/or an application for example, which has been updated (e.g. fully patched, newest version, etc.) to address known exploits. These VM(s) are used to check for the presence of zero-day exploits. The assumption employed herein is that, if the exploit was previously known, software vendors would patch or revise their software against the attack.

Another embodiment of the disclosure is directed to provisioning a first set of VMs that is based on software profile(s) associated with vulnerable software (e.g. OS, application, driver, etc.). The "vulnerable software" includes software without the most recent patches or older susceptible versions (i.e. no software upgrade to address known issues involving security or system stability). The first set of VMs is adapted to detect one or more exploits caused by malware. Thereafter, information associated with the detected exploit(s) is provided as input into a second set of VMs that is based on the software profile(s) that is associated with the fortified software. Hence, the OS and/or application(s) identified in this software profile may be the same as those identified in the software profile utilized to instantiate the first set of VMs but with a later revision, version or service pack. The second set of VMs is adapted to check whether the detected exploit(s) are associated with a zero-day attack.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor; one or more processor cores; a programmable gate array; a microcontroller; an application specific integrated circuit; receiver, transmitter and/or transceiver circuitry; semiconductor memory; combinatorial circuitry; or the like. It is contemplated that all logic components, typically represented by boxes in FIGS. 1-7 herein, may be deployed as hardware, software and/or firmware.

Logic (or engine) also may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information, such text, software, images, audio, metadata and/or other digital data for example, that is transmitted as one or more messages. Each message(s) may be in the form of a packet, a frame, an Asynchronous Transfer Mode "ATM" cell, or any other series of bits having a prescribed format. The content may be received as a data flow, namely a group of related messages, being part of ingress data traffic.

One example of content may include web content, namely data traffic that may be transmitted using a Hypertext Transfer Protocol (HTTP), Hypertext Markup Language (HTML) protocol, or any other manner suitable for display on a Web browser software application. Another example of content includes electronic mail (email), which may be transmitted using an email protocol such as Simple Mail Transfer Protocol (SMTP), Post Office Protocol version 3 (POPS), or Internet Message Access Protocol (IMAP4). Yet another example of content includes an Instant Message, which may be transmitted using Session Initiation Protocol (SIP) or Extensible Messaging and Presence Protocol (XMPP) for example. A final example of content includes one or more files that are transferred using a data transfer protocol such as File Transfer Protocol (FTP) for subsequent storage on a file share.

The term "malware" is software or data that includes at least one exploit, namely software or data that takes advantage of one or more vulnerabilities within system software and produces an undesired behavior. The behavior is deemed to be "undesired" based on customer-specific rules, manufacturer-based rules, or any other type of rules formulated by public opinion or a particular governmental or commercial entity. Examples of an undesired behavior may include a communication-based anomaly or an execution-based anomaly that (i) alters the functionality of an electronic device and/or (ii) provides an unwanted functionality which may be generally acceptable in other context.

The term "transmission medium" is a communication path between two or more systems (e.g. any electronic devices with data processing functionality such as, for example, a security appliance, server, mainframe, computer, netbook, tablet, smart phone, router, switch, bridge or brouter). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine" (VM) is a simulation of an electronic device (abstract or real) that is usually different from the electronic device conducting the simulation. VMs may be based on specifications of a hypothetical electronic device or emulate the architecture and functions of a real world computer. A VM can be one of many different types such as, for example, hardware emulation, full virtualization, para-virtualization, and/or operating system-level virtualization virtual machines.

A "software profile" is information that is used for virtualization of an operating environment (e.g. configuration of a VM forming part of a VM environment) to receive content for malware analysis. The software profile may identify a guest operating system "OS" type; a particular version of the guest OS; one or more different application types; particular version(s) of the application type(s); virtual device(s); or the like.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Zero-Day Exploit Detection Architecture

Referring to FIG. 1, an exemplary block diagram of operations performed by virtual machine (VM) environments 100, which may be provided by a malware content detection (MCD) system and/or zero-day discovery system described below. More specifically, upon receipt of "A" objects 110 (A≥1) associated with incoming content, a first VM environment 120 determines whether any of the received objects 110 include information associated with an exploit.

According to this disclosure, the received objects 110 are virtually executed within the first VM environment 120 that comprises at least one VM that is based on one or more software profiles (software profile(s)) directed to vulnerable software. For instance, where an object is a Hypertext Transfer Protocol (HTTP) message, the software profile for a first VM may include Windows® OS 7 and Internet Explorer® (version 9), where both of these software modules have no installed patches. The first VM environment 120 may feature a second VM, which includes Windows® OS 8 and Internet Explorer® (version 10), where both of these software modules have no installed patches.

If no exploits are determined by the first VM environment 120, no further analysis is needed with respect to the presence of a zero-day attack. However, upon detecting "B" exploits 130 (B≥1), these exploit(s) 130 are input into a second VM environment 140. The number of "B" exploits may be equal to or lesser in number than "A" objects.

According to an embodiment of the invention, the second VM environment 140 is adapted to determine whether any of the exploit(s) 130 (C≥1) have not been previously detected. One technique for such determination is whether any undesired behavior is still detected within the second VM environment 140, which comprises at least one VM that is based on fortified software (e.g., OS and/or applications installed with all software security patches and/or newest version). If so, the particular exploit 150 that caused the undesired behavior is identified to be part of a zero-day attack. Otherwise, if no further undesired behaviors are detected, the exploit(s) 130 are not associated with zero-day attacks.

Of course, although not shown, it is contemplated that some or all of the operations conducted by the first VM environment 120 and the second VM environment 140 may be conducted concurrently in lieu of sequentially. This may require objects 110 as input for both environments 120 and 140 and a determination made if an exploit caused by an undesired behavior occurs in both environments.

Figure 2:
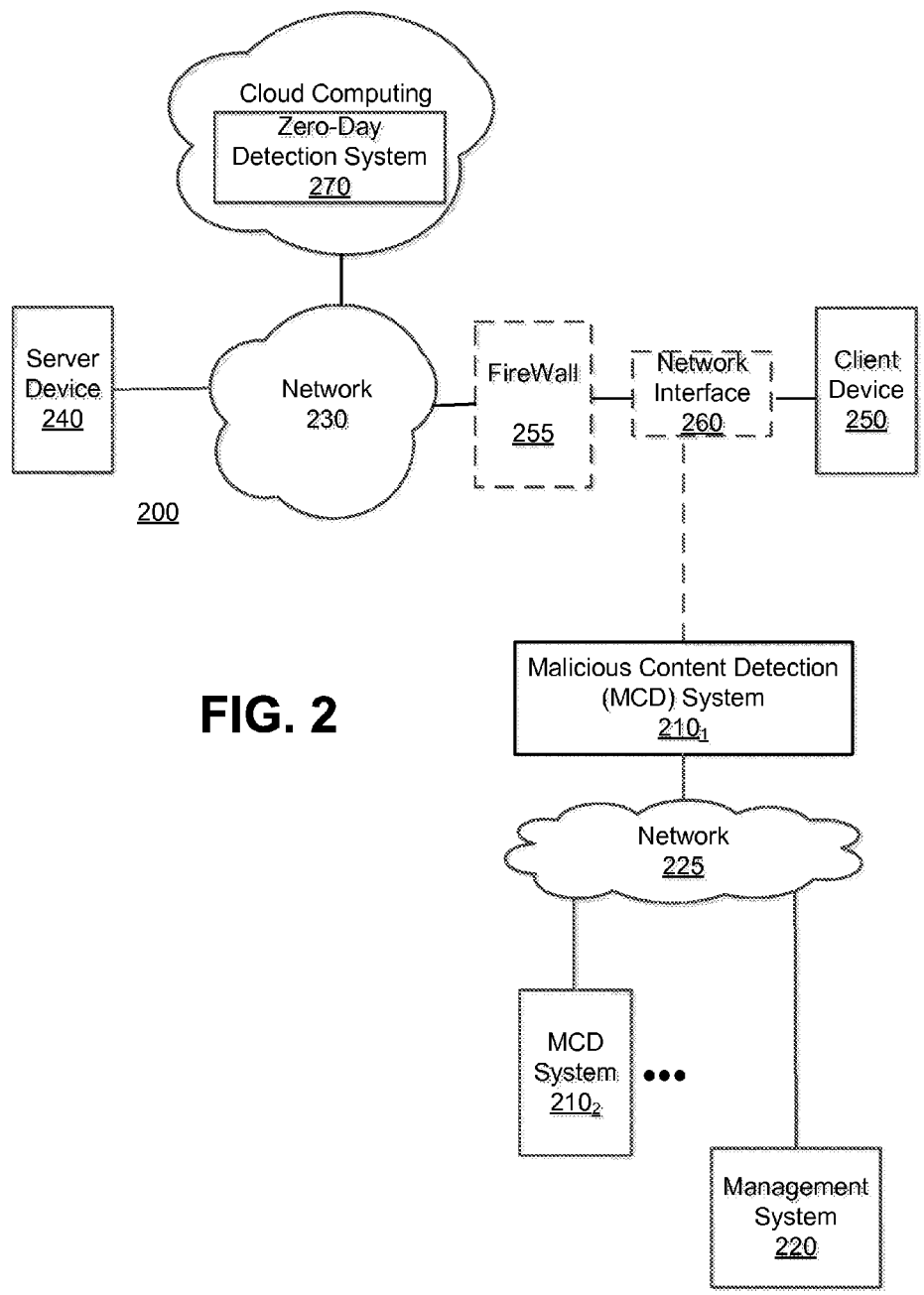
FIG. 2 is a first exemplary block diagram of a network adapted with a malware content detection (MCD) system and a zero-day discovery system.

Referring to FIG. 2, an exemplary block diagram of a communication system 200 deploying a plurality of malware content detection (MCD) systems $210_1$-$210_N$ (N>1, e.g. N=2) communicatively coupled to a management system 220 via a network 225 is shown. In general, management system 220 is adapted to manage MCD systems $210_1$-$210_N$. For instance, management system 220 may be adapted to cause malware signatures generated as a result of malware detection by any of MCD systems $210_1$-$210_N$ (e.g. MCD system $210_2$) to be shared with one or more of the other MCD systems $210_1$-$210_N$ (e.g. MCD system $210_1$) including, for example, where such sharing is conducted on a subscription basis.

Herein, according to this embodiment of the invention, first MCD system $210_1$ is an electronic device that is adapted to (i) intercept data traffic routed over a communication network 230 between at least one server device 240 and at least one client device 250 and (ii) monitor, in real-time, content within the data traffic. More specifically, first MCD system $210_1$ may be configured to inspect content received via communication network 230 and identify "suspicious" content. The incoming content is identified as "suspicious" when it is assessed, with a certain level of likelihood, that at least one characteristic identified during inspection of the content indicates the presence of an exploit.

Figure 3:
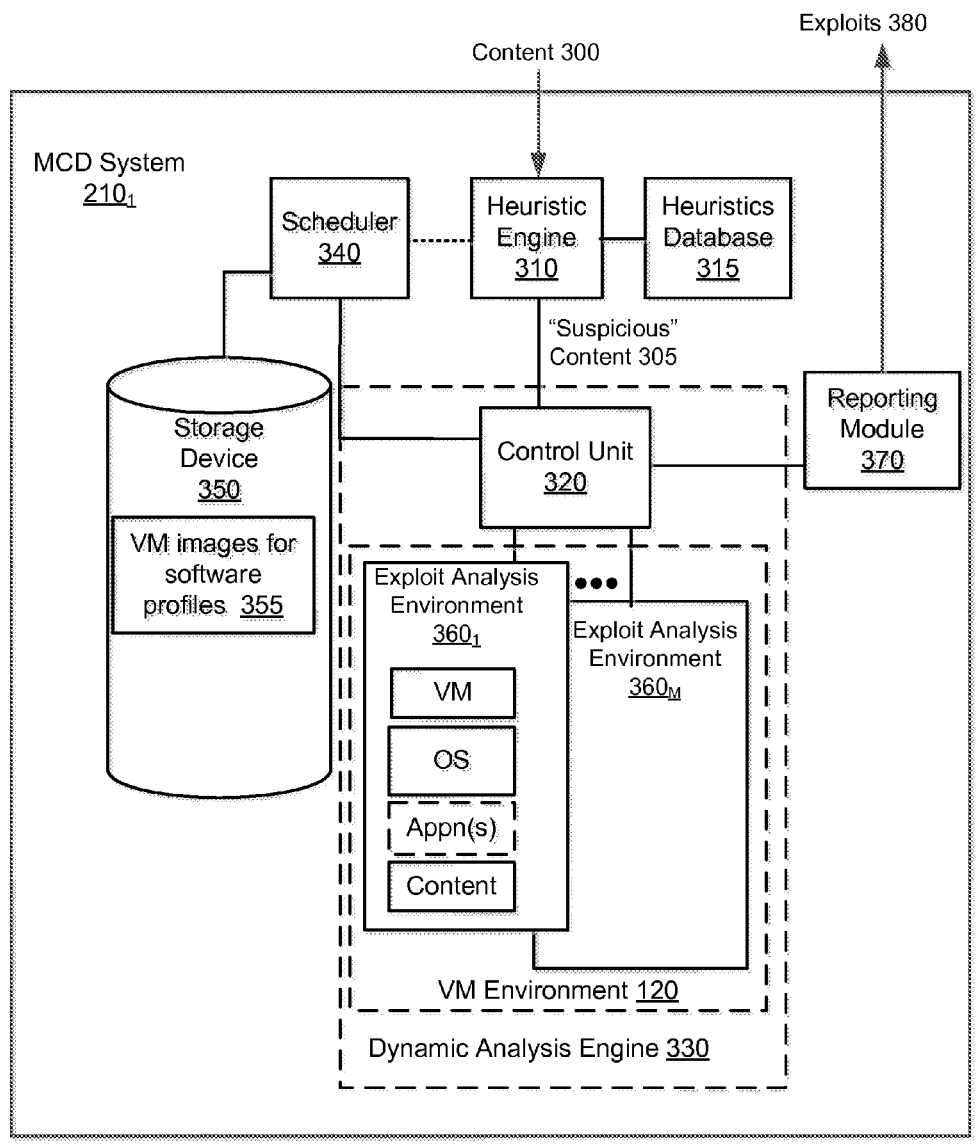
FIG. 3 is a first exemplary block diagram of the MCD system of FIG. 2 employing a first VM environment.

As shown in FIG. 3, the suspicious content is further analyzed within one or more VM-based environments $360_1$-$360_M$ (M≥1) to detect whether the suspicious content includes at least one object associated with one or more exploits. These exploit analysis environments $360_1$-$360_M$ may feature VMs that are based on the same software profile, where the suspicious content 305 is detected within multiple data flows within incoming content 300 directed to the particular type of operating environment. Alternatively, each exploit analysis environment $360_1$, . . . , or $360_M$ may be based on different software profiles (e.g., different guest OS type; same OS but different application types; etc.), although it is contemplated that the differences between software profiles may be slight (e.g., different versions of the same software types; etc.).

Figure 6:
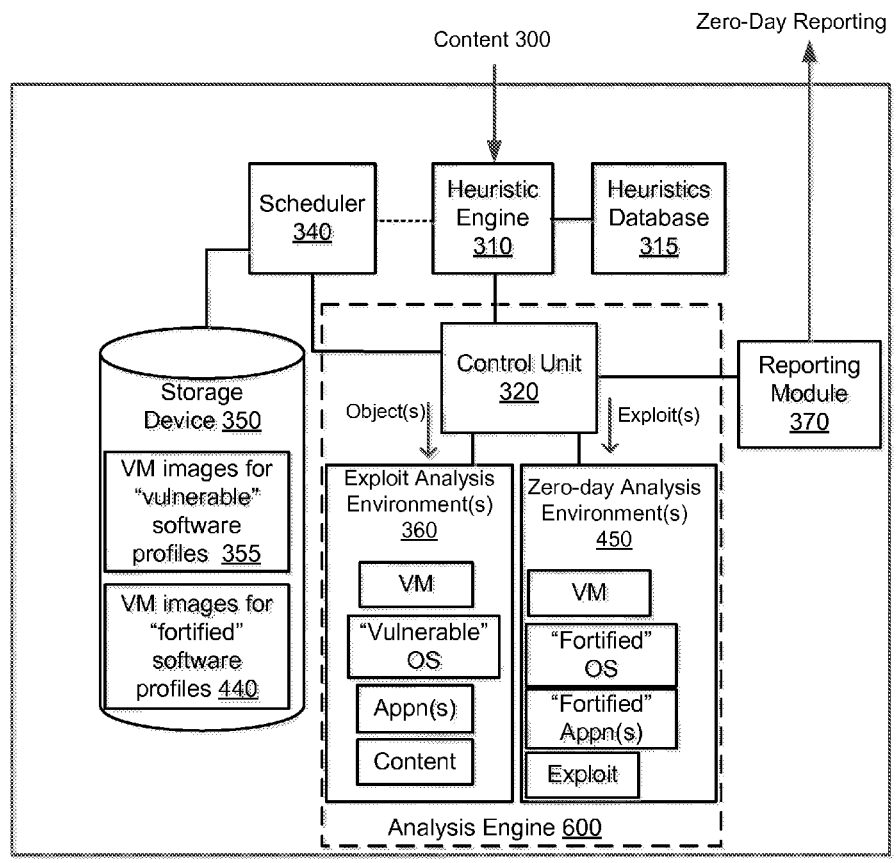
FIG. 6 is an exemplary block diagram of the MCD system of FIG. 2 providing both exploit analysis and zero-day analysis environments.

Referring back to FIG. 2, the first MCD system $210_1$ may be a web-based security appliance that is configured to inspect ingress data traffic and identify whether content associated with the data traffic includes exploits. If one or more exploits are detected, a deeper analysis of the exploit (s) is conducted. This deeper analysis to detect if any undesired behaviors still exist may be conducted within a remotely located system, such as zero-day discovery system 270 within the cloud, as described below. Alternatively, as shown in FIG. 6, the deeper analysis may be conducted locally within first MCD system $210_1$, using one or more specific VMs that are based on the fortified software as an integrated zero-day discovery system.

The communication network 230 may include a public computer network such as the Internet, in which case an optional firewall 255 (represented by dashed lines) may be interposed between communication network 230 and client device(s) 250. Alternatively, the communication network 230 may be a private computer network such as a wireless telecommunication network, wide area network, or local area network, or a combination of networks.

The first MCD system $210_1$ is shown as being coupled with the communication network 230 (behind the firewall 255) via a network interface 260. The network interface 260 operates as a data capturing device (referred to as a "tap" or "network tap") that is configured to receive data traffic propagating to/from the client device 250 and provide content (objects) from the data traffic to the first MCD system $210_1$.

In general, the network interface 260 receives and copies the content that is received from and provided to client device 250. Alternatively, the network interface 260 may copy only a portion of the content, for example, a particular number of objects associated with the content. For instance, in some embodiments, the network interface 260 may capture metadata from data traffic intended for client device 250, where the metadata is used to determine (i) whether content within the data traffic includes any exploits and/or (ii) the software profile associated with such content. In other embodiments, a heuristic module (described below) may determine the particular software profile used for instantiating the VM(s) for exploit detection.

It is contemplated that, for any embodiments where the first MCD system $210_1$ is implemented as an dedicated appliance or a dedicated computer system, the network interface 260 may include an assembly integrated into the appliance or computer system that includes network ports, network interface card and related logic (not shown) for connecting to the communication network 230 to non-disruptively "tap" data traffic propagating through firewall 255 and provide a copy of the data traffic to the heuristic engine 310 of FIG. 3. In other embodiments, the network interface 260 can be integrated into an intermediary device in the communication path (e.g. firewall 255, router, switch or other network device) or can be a standalone component, such as an appropriate commercially available network tap. In virtual environments, a virtual tap (vTAP) can be used to copy traffic from virtual networks.

Referring to FIG. 3, a first exemplary block diagram of first MCD system $210_1$ of FIG. 2 is shown. Herein, first MCD system $210_1$ comprises a heuristic engine 310, a heuristics database 315, an analysis engine 330, a scheduler 340, a storage device 350, and a reporting module 370. In some embodiments, the network interface 260 may be contained within the first MCD system $210_1$. Also, heuristic engine 310, analysis engine 330 and/or scheduler 340 may be software modules executed by the same or different processors. As an example, the heuristic engine 310 may be one or more software modules executed by a first processor, while the analysis engine 330 and/or scheduler 340 may be executed by a second processor, where these processors may be located at geographically remote locations and communicatively coupled via a network.

According to one embodiment of the disclosure, the first VM environment 120 may be deployed as one or more VMs with predetermined software profiles. Hence, no determination of a particular software profile that is compatible for suspicious content under analysis is needed. Alternatively, the first VM environment 120 may be deployed as one or more VMs where logic within the first MCD system $210_1$ operates in concert to determine the software profile for analysis of the suspicious content. The later deployment is described below.

In general, the heuristic engine 310 serves as a filter to permit subsequent malware analysis on portion(s) of incoming content 300 that may have at least one exploit. As an ancillary benefit, by analyzing only the portion of the incoming content 300 that may have an "exploit" (i.e. portions of content that may be exploited by malware), various system resources may be conserved and a faster response time may be provided in determining the presence of malware within analyzed content 300.

As illustrated in FIG. 3, the heuristic engine 310 receives the copy of incoming content 300 from the network interface 260 and applies heuristics to determine if any of the content is "suspicious". The heuristics applied by the heuristic engine 310 may be based on data and/or rules stored in the heuristics database 315. Also, the heuristic engine 310 may examine the image of the captured content without executing or opening the captured content.

For example, the heuristic engine 310 may examine the metadata or attributes of the captured content and/or the code image (e.g., a binary image of an executable) to determine whether a certain portion of the captured content matches or has a high correlation with a predetermined pattern of attributes that is associated with a malicious attack. According to one embodiment of the disclosure, the heuristic engine 310 flags content from one or more data flows as suspicious after applying this heuristic analysis.

Thereafter, according to one embodiment of the invention, the heuristic engine 310 may be adapted to transmit at least a portion of the metadata or attributes of the suspicious content 305, which may identify attributes of the client device 250, to a control unit 320. Control unit 320 is adapted to control formation of one or more exploit analysis environments $360_1$-$360_M$. Such metadata or attributes are used to identify at least one VM needed for subsequent malware analysis and formulate software profile information used to formulate that VM. In another embodiment of the disclosure, the control unit 320 may be adapted to receive one or more messages (e.g. data packets) from the heuristic engine 310 and analyze the message(s) to identify the software profile information associated with the needed VM.

For instance, as an illustrative example, the suspicious content under analysis may include an email message that was generated, under control of Windows® 7 Operating System, using a Windows® Outlook 2007, version 12. The email message further includes a Portable Document Format (PDF) attachment in accordance with Adobe® Acrobat®, version 9.0. Upon determining that the email message includes suspicious content, heuristic engine 310 and/or control unit 320 may be adapted to provide software profile information to scheduler 340 in order to identify a particular type of VM needed to conduct dynamic analysis of the suspicious content. According to this illustrative example, the software profile information would include vulnerable software for (1) Windows® 7 Operating System (OS); (2) Windows® Outlook 2007, version 12; and (3) Adobe® Acrobat®, version 9.0, all without the latest security patches.

The control unit 320 supplies the software profile information to the scheduler 340, which conducts a search of information within storage device 350 to determine if a VM image 355 identified by the software profile information resides within storage device 350. The VM image 355 supports the above-identified OS and one or more applications, which may have known vulnerabilities unlike the upgraded software deployed within client device 250. If so, the scheduler 340 uses the VM image 355 to instantiate a VM within exploit analysis environment $360_1$ in order to analyze the suspicious content to determine if such content includes any exploits.

Of course, it is contemplated that if the storage device 350 does not feature a software profile supporting the above-identified OS/application(s), the scheduler 340 may simply ignore the VM request from control unit 320 or may obtain an VM image directed to similar software. For example, the scheduler 340 may be adapted to obtain a VM image based on the same OS but a different non-patched version of a targeted application. Alternatively, the scheduler 340 may be adapted to obtain the same OS (e.g. Windows® OS 7) along with an application different from the targeted application but having similar functionality and a similar lack of security patches (e.g. different type of email software such as Mozilla® Thunderbird™; different browser such as Chrome® in lieu of Internet Explorer®, etc.). As another alternative, the scheduler 340 may receive a different non-patched OS image that supports similar functionality (e.g., Windows® OS 8 or Windows® Vista® in lieu of Windows® OS 7; LINUX® in lieu of Windows® OS 7; etc.).

In yet another embodiment of the disclosure, the heuristic engine 310 may determine the software profile information from the data traffic by receiving and analyzing the content from the network interface 260. For instance, according to one embodiment of the disclosure, it is contemplated that the heuristic engine 310 may be adapted to transmit the metadata identifying the client device 250 to the analysis engine 330, where such metadata is used to identify a desired software profile. The heuristic engine 310 may then transmit the software profile information to the scheduler 340 in lieu of such information being provided from control unit 320 within the analysis engine 330.

Alternatively, the control unit 320 may be adapted to receive one or more data packets of a data flow from the heuristic engine 310 and analyze the one or more data packets to identify the software profile. In yet other embodiment of the disclosure, the scheduler 340 may be adapted to receive software profile information, in the form of metadata or data packets, from the network interface 260 or from the heuristic engine 310 directly.

The storage device 350 may be configured to store one or more VM disk files forming a VM profile database, where each VM disk file is directed to a different software profile for a VM. In one example, the VM profile database may store a plurality of VM disk files having VM images for multiple software profiles in order to provide the collective capability for simulating the performance of a wide variety of client devices 250.

The analysis engine 330 is adapted to execute multiple VMs concurrently to support different VM operating environments that simulate the receipt and/or execution of different data flows of "suspicious" content by different network devices. As used herein, "execution" may be broadly construed as processing information, where such information may include instructions. Furthermore, the analysis engine 330 analyzes the effects of such content upon execution. The analysis engine 330 may identify exploits by detecting undesired behavior caused by simulated execution of the suspicious content as carried out by the VM. This undesired behavior may include unusual network transmissions, unusual changes in performance, and the like.

The analysis engine 330 may flag the suspicious content as malware according to observed undesired behavior of the VM. Different types of behaviors may be weighted based on the likelihood of system compromise, where suspicious content is determined when the weighted value exceeds a certain threshold. The reporting module 370 may issue alert messages indicating the presence of one or more exploits to the zero-day discovery system 270 of FIG. 2, and may use pointers and other reference information to identify what message(s) (e.g. packet(s)) of the suspicious content may contain the exploit(s). Additionally, the server device 240 may be added to a list of malicious network content providers, and future network transmissions originating from the server device 240 may be blocked from reaching their intended destinations, e.g., by firewall 255.

Figure 4:
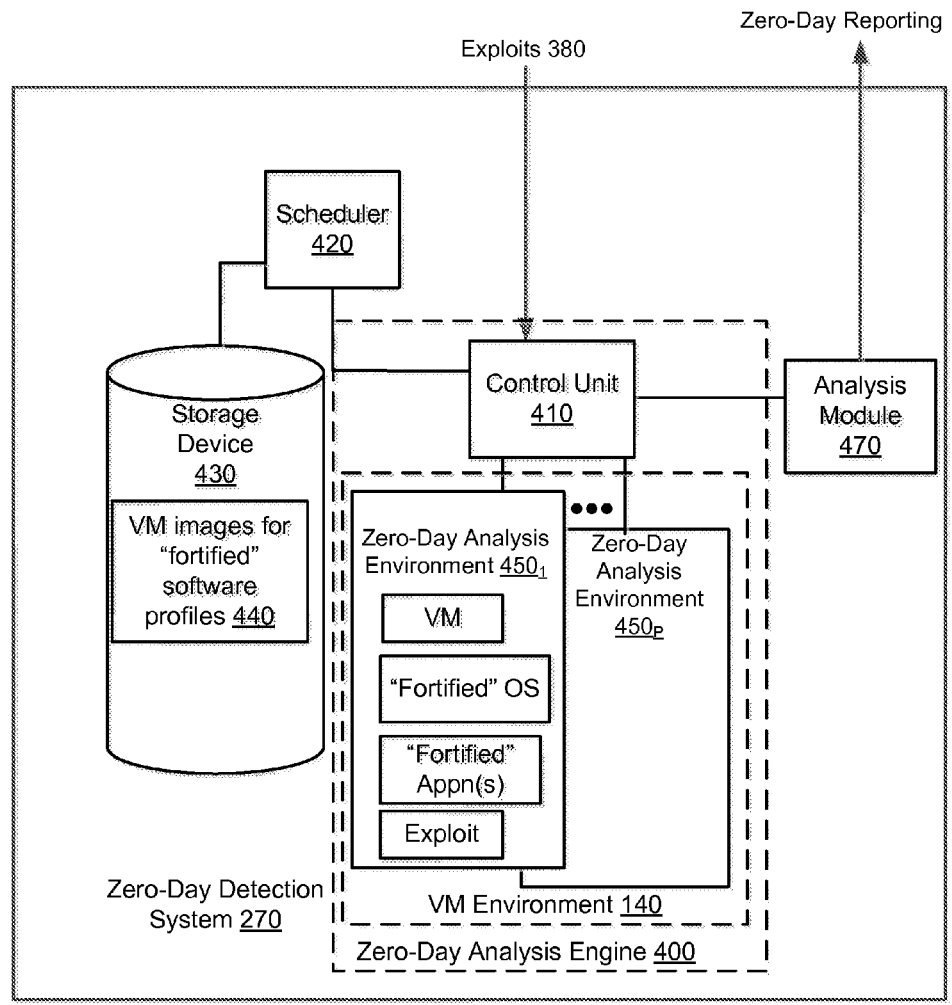
FIG. 4 is an exemplary block diagram of the zero-day discovery system of FIG. 2 employing a second VM environment.

Referring to FIG. 4, an exemplary block diagram of the zero-day discovery system 270 is shown. Herein, zero-day discovery system 270 comprises an analysis engine 400, a scheduler 420, a storage device 430, and an analysis module 470. In some embodiments, analysis engine 400 and/or scheduler 420 may be software modules executed by a processor that are adapted to receive content, perform deeper malware analysis and access one or more non-transitory storage mediums operating as at least part of storage device 430 and/or analysis module 470.

According to one embodiment of the disclosure, the second VM environment 140 of FIG. 1 may be deployed as one or more VMs based on a fortified software profile(s). Hence, no determination of a particular fortified software profile that is compatible for one or more uploaded exploits under analysis is needed. Alternatively, the second VM environment 140 may be deployed as one or more VMs where logic within the zero-day discovery system 270 operates in concert to determine the fortified software profile for analysis of the exploit(s). The later deployment is described below.

In general, one or more objects associated with exploits 380 are received by zero-day analysis engine 400, which may be adapted to provide the VM environment 140 to analyze whether the exploit(s) are associated with a zero-day attack. More specifically, control unit 410 of analysis engine 400 receives the object(s) associated with one or more exploits and identifies one or more software profiles corresponding to the exploit(s).

For instance, as an illustrative example, the attributes of the exploit may be uncovered to formulate the software profile information. Alternatively, the software profile information associated with detected exploit(s) 380 may be uploaded to zero-day discovery system 270 from reporting module 370 of FIG. 3. The uncovered or uploaded software profile information may be used for selection of one or more VM images for each zero-day analysis environments $450_1$-$450_p$ ($P \geq 1$).

The analysis engine 400 supplies the software profile information to the scheduler 420, which conducts a search as to whether any VM images 440 with corresponding fortified software resides within storage device 430. If so, the scheduler 420 uses that VM image to instantiate the VM, which operates within the analysis engine 400 for analysis of the exploit to determine if such exploit is associated with a zero-day attack. If not, the zero-day attack analysis is not performed and a report may be generated to a user/administrator regarding the need to ensure deployment of a particular fortified version of software represented by the fortified software profile.

The analysis engine 400 is adapted to execute multiple VMs to determine whether the exploit causes any undesired behaviors, where the multiple VMs may be based on (i) the same software profiles in order to provide higher reliability that the exploit is a zero-day attack or (ii) different software profiles to see if the exploit may be directed to a particular type of OS and/or application. If the analysis engine 400 determines that the exploit has caused one or more undesired behaviors, the exploit is considered to be associated with a zero-day attack. Alternatively, different types of behaviors may be weighted based on the likelihood of system compromise, where an exploit is determined to be a zero-day when the weighted value exceeds a threshold value.

Thereafter, the zero-day discovery system 270 may be adapted to generate (1) an advisory message directed to a particular entity or the public at large regarding the particulars of the uncovered zero-day attack, and/or (2) a report message (referred to as an "Indicator of Compromise 'IOC'") provided to an administrator of the enterprise network 225. The IOC warns of the zero-day attack and provides information for use in forensic analysis of network devices within the enterprise network 225. This information may include, but is not limited or restricted to an executable binary associated with the exploit, a pointer to (or identifier of) information associated with the exploit, and/or its monitored behaviors such as registry key changes, network connectivity events, processes, or the like.

Of course, it is contemplated that a security signature may be produced from the contents of the IOC, where the security signature may be used reliably to detect the presence of malware associated with the zero-day attack in subsequent communications to network devices deployed within enterprise network 225.

As mentioned previously, in lieu of instantiating VMs in accordance with a software profile to which the exploit is directed, a number of VMs based on predetermined software profiles may be preloaded and used for zero-day attack analysis. The predetermined software profiles may be a combination of different fortified OSes and/or applications as well as different versions of these fortified OS or application. The software associated with the fortified software profiles (e.g., updated OS, and/or updated applications, etc.) may be continuously updated with the latest upgraded (and patched) version, where an object associated with an exploit is run on each of the VMs to determine if an undesired behavior is experienced. If so, the undesired behavior and corresponding attributes are provided to analysis module 470, which determines whether, based on the undesired behavior, the network device is compromised through evaluation of the severity of the behavior. If so, the exploit is determined to be associated with a zero-day attack.

Figure 5:
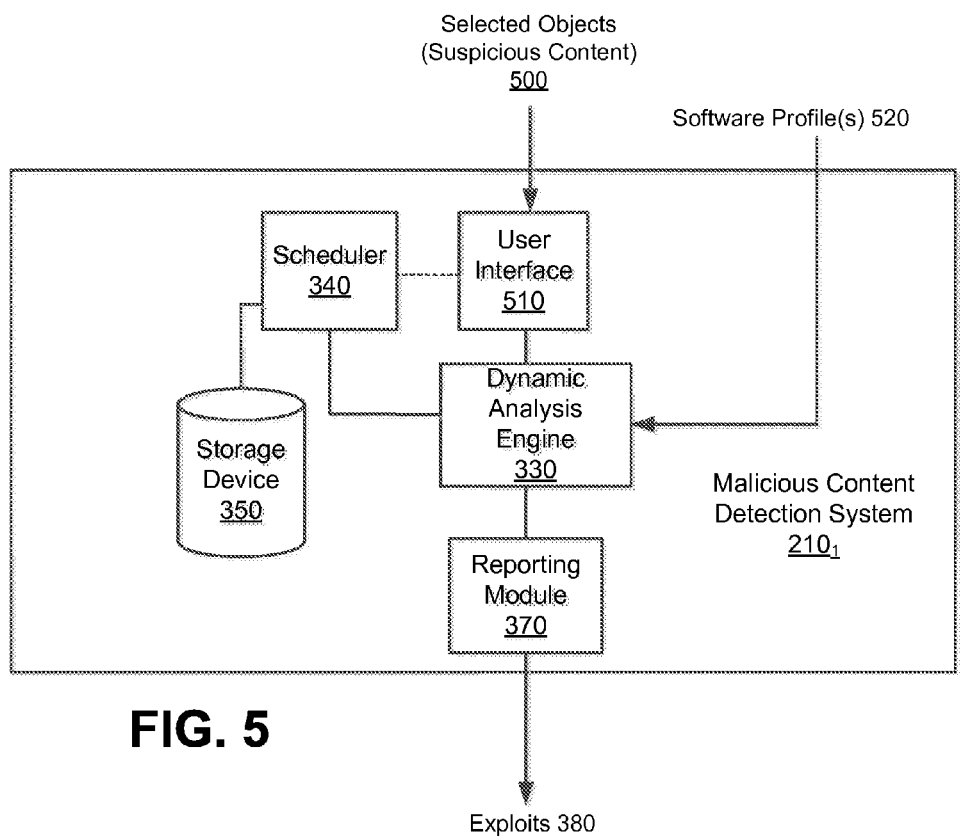
FIG. 5 is a second exemplary block diagram of the MCD system of FIG. 2.

Referring now to FIG. 5, a second exemplary embodiment of MCD system $210_1$ set forth in FIG. 2 is shown, where the software profile for VM instantiation is not determined through analysis of suspicious content (e.g. metadata, data packets, binary, etc.) by the network interface 260, heuristic engine 310, or analysis engine 330. Rather, this software profile directed to "vulnerable" software is uploaded by the user and/or network administrator.

More specifically, a user interface 510 allows the user or network administrator (hereinafter referred to as "user/administrator") to introduce objects 500 of the suspicious content in accordance with one or more prescribed software profiles 520. The prescribed software profile(s) 520 may be preloaded or selected by the user/administrator in order to instantiate one or more VMs based on operations of the scheduler 340 and storage device 350 as described above. The VMs perform dynamic analysis of the objects 500 to monitor for undesired behavior during virtual execution of these objects 500 within the VMs. The exploit(s) associated with detected undesired behavior are uploaded into the zero-day discovery system 270 of FIG. 2.

Referring to FIG. 6, it is contemplated that the functionality of zero-day discovery system 270 of FIG. 2 may be implemented within analysis engine 600 of the first MCD system 210₁. Herein, any detected exploits by exploit analysis environments(s) 360 are provided to zero-day analysis environment(s) 450. One or more objects associated with these exploits are input into the zero-day analysis environment(s) 450 to determine if the exploit is associated with a zero-day attack as described above.

Figure 7:
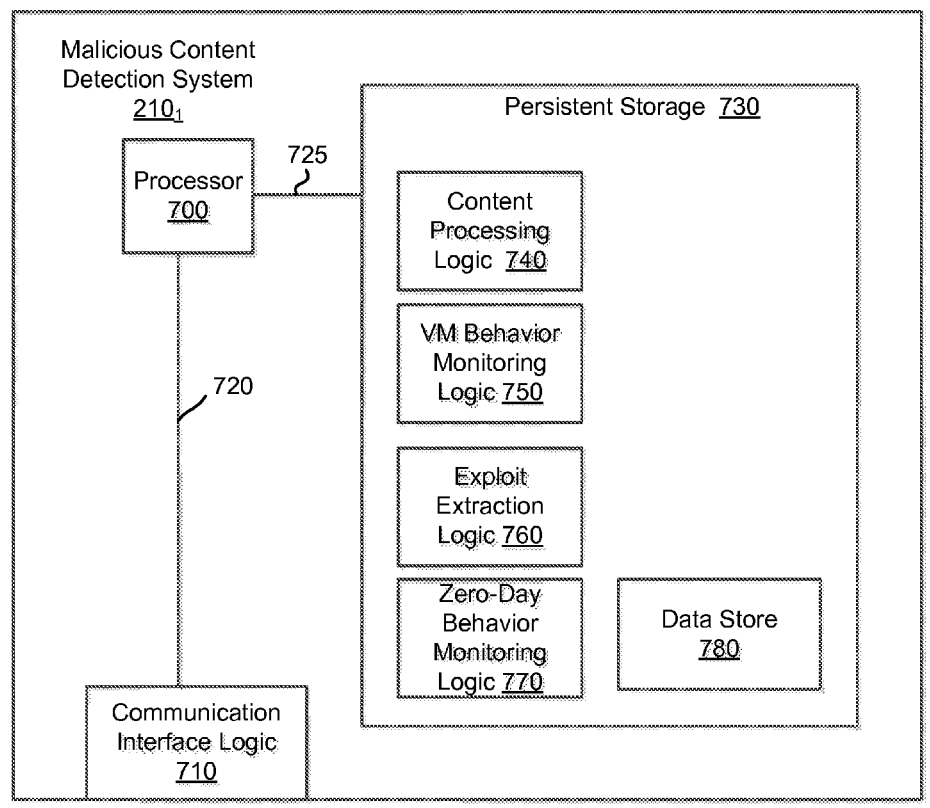
FIG. 7 is an exemplary block diagram of logic deployed within the MCD system of FIG. 2 and/or FIG. 6.

Referring now to FIG. 7, an exemplary block diagram of logic that is implemented within MCD system 210₁ is shown. MCD system 210₁ comprises one or more processors 700 that are coupled to communication interface logic 710 via a first transmission medium 720. Communication interface logic 710 enables communications with MCD systems 210₂-210ₙ of FIG. 2 as well as other electronic devices over private and/or public networks. According to one embodiment of the disclosure, communication interface logic 710 may be implemented as a physical interface including one or more ports for wired connectors. Additionally, or in the alternative, communication interface logic 710 may be implemented with one or more radio units for supporting wireless communications with other electronic devices.

Processor 700 is further coupled to persistent storage 730 via transmission medium 725. According to one embodiment of the disclosure, persistent storage 730 may include content processing logic 740, VM behavior monitoring logic 750, exploit extraction logic 760, zero-day behavior monitoring logic 770 and a data store 780.

Content processing logic 740 is configured to analyze incoming content in order to determine (i) if any segment of the content is "suspicious" requiring further analysis and (ii) one or more software profiles for VMs on which the content may run. The suspicious content along with software profile information representative of these software profiles are provided to the VM behavior monitoring logic 750.

Upon receiving software profile information, the VM behavior monitoring logic 750 is configured to obtain images of "vulnerable" software from data store 780. These images are used to instantiate VMs for testing whether the suspicious content includes exploits if any of these VMs performing operations on the suspicious content detect one or more undesired behaviors. The exploit(s) are identified and portions of the suspicious content including the object(s) associated with the exploit(s) are extracted by exploit extraction logic 760. Exploit extraction logic 760 provides the suspicious content directed to the exploit(s) as input into the zero-day behavior monitoring logic 770.

Upon receiving the information associated with the exploits and configuring one or more VMs with fortified software, whether these VMs are preconfigured or formulated based on the "fortified" software profile information, the zero-day behavior monitoring logic 770 is configured to conduct testing whether the exploits cause any undesired behaviors to the VMs. If so, the particulars associated with the exploit are stored within the data store 780 and subsequently reported as an IOC or other advisory. If no undesired behaviors are detected, the exploit is not considered part of a zero-day attack.

III. Zero-Day Exploit Detection Operations

Figure 8:
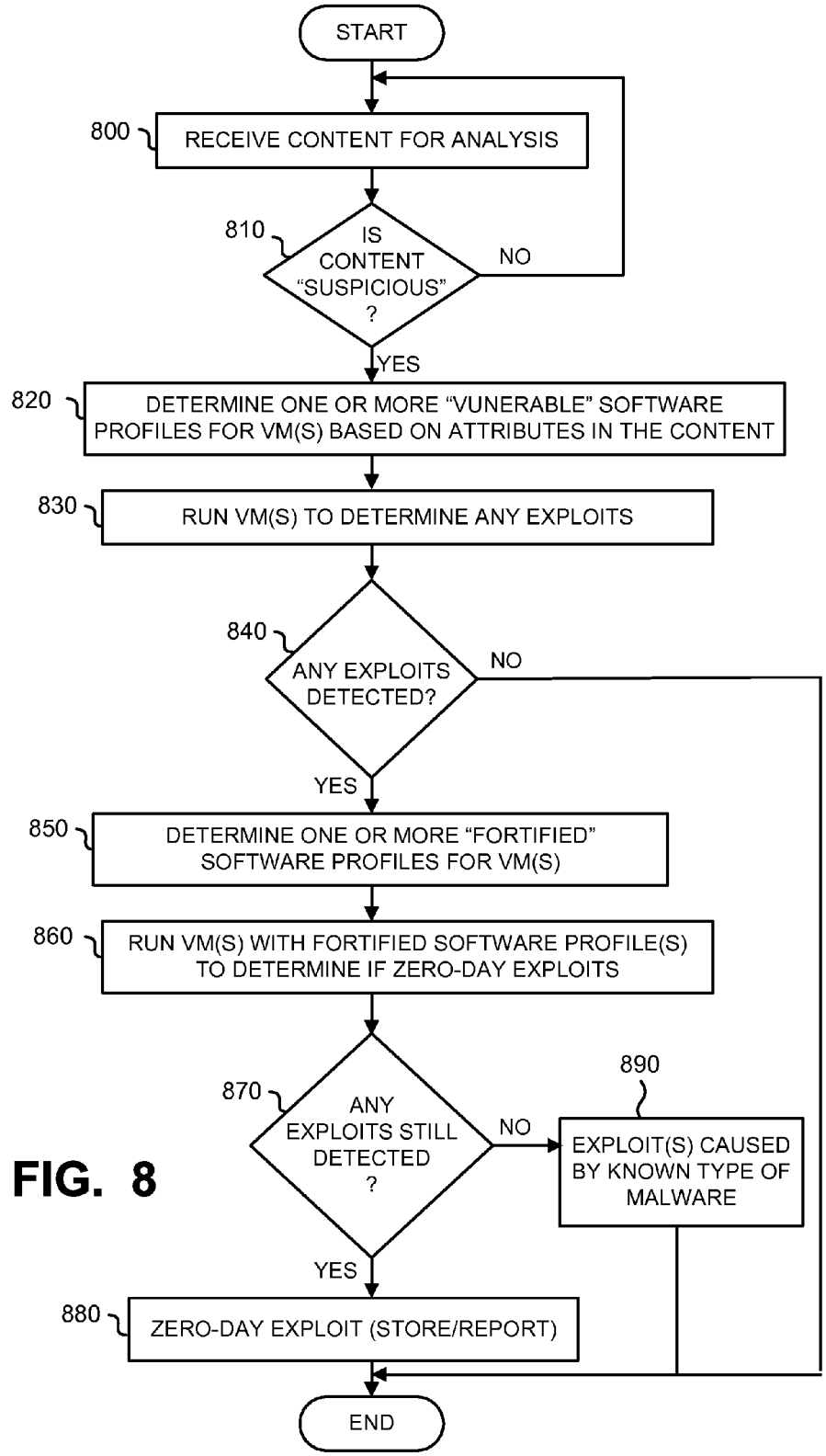
FIG. 8 is a first exemplary flowchart outlining the operations for zero-day exploit detection.

Referring to FIG. 8, a first exemplary flowchart outlining the operations for zero-day exploit detection is shown. Upon receiving content, a determination is made as to whether the content is "suspicious," namely whether analysis of the content indicates the presence of an exploit (block 800 and 810). Where the content is determined to be "suspicious," the attributes of the content may be used to determine one or more software profiles (block 820). VMs within the exploit analysis environment are based on these software profile(s).

Thereafter, the VM(s) perform operations on the suspicious content and analyzes the results of these operations to determine if any exploits are present (block 830). If no exploits are detected, no further zero-day analysis is needed (block 840). However, if one or more exploits are detected, the exploits are provided as input to a zero-day analysis environment.

In the zero-day analysis environment, a determination is made as to which fortified software profiles are used the VMs (block 850). This determination may be based on information provided by the exploit or information provided along with the exploit. After one or more VMs are instantiated based on the fortified software profiles, these VM are run with fortified software to determine if any zero-day exploits exist (block 860). If anomalous behavior is detected during VM analysis of the exploit, this exploit is determined to be a zero-day exploit and information gathered during analysis of the exploit (e.g., register key changes, etc.) is stored and reported (blocks 870 and 880). Otherwise, the analyzed exploit is considered to be associated with a known type of malware (block 890).

Figure 9:
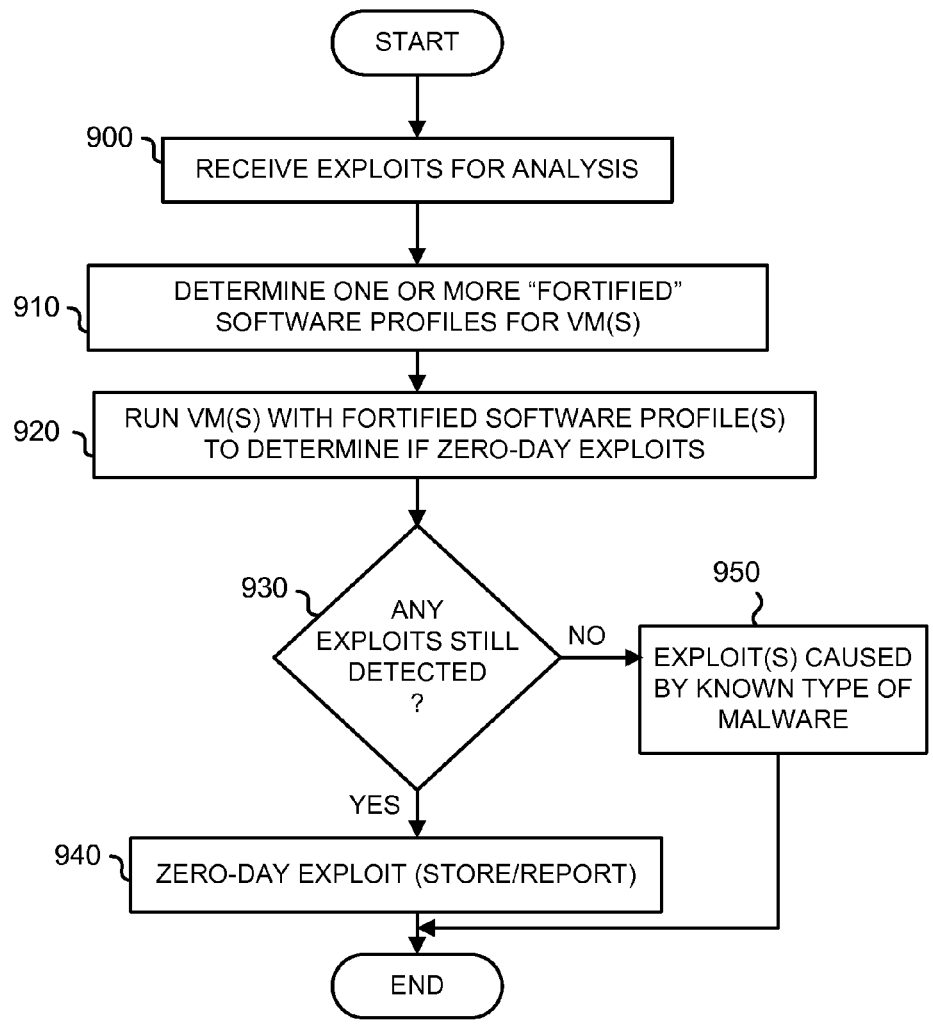
FIG. 9 is a second exemplary flowchart outlining the operations for zero-day exploit detection.

Referring to FIG. 9, a second exemplary flowchart outlining the operations for zero-day exploit detection is shown. Upon receiving information associated with exploits for analysis, a determination is made as to which fortified software profiles are to be used by the VMs for testing (blocks 900 and 910). This determination may be based on information provided by the exploit itself or information provided along with the exploit. Upon instantiation based on the fortified software profiles, the VM(s) operate and monitor behavior during processing of the information associated with the exploit (block 920). If anomalous behavior is still detected during VM-based execution of the information associated with the exploit, this exploit is determined to be a "zero-day" and information gathered during analysis of the exploit (e.g., register key changes, etc.) is stored and reported (blocks 930 and 940). Otherwise, the analyzed exploit is considered to be associated with a known type of malware (block 950).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A method for determining a zero-day attack by an electronic device, comprising:
   determining a plurality of fortified software profiles for use in instantiating a plurality of virtual machines based on information associated with an exploit;
   instantiating, by the electronic device, a first virtual machine of the plurality of virtual machines based on a first fortified software profile of the plurality of fortified software profiles and a second virtual machine of the plurality of virtual machines based on a second fortified software profile of the plurality of fortified software profiles that is different from the first fortified software profile, the first fortified software profile includes an operating system and an application and the second fortified software profile includes an update of the operating system or an update of the application;

processing content associated with the exploit on both the first virtual machine and the second virtual machine, the processing of the content being performed concurrently in which one or more of operations performed by the first virtual machine at least partially overlaps in time one or more operations performed by the second virtual machine;

determining, by the electronic device, undesired behaviors during the processing of the content associated with the exploit on both the first virtual machine and the second virtual machine;

weighting, by the electronic device, each of the undesired behaviors, determined during the processing of the content associated with the exploit, to obtain a weighted value; and determining, by the electronic device, that the exploit is associated with the zero-day attack responsive to the weighted value exceeds a threshold value.

2. The method of claim 1, wherein prior to instantiating the first virtual machine based on the first fortified software profile, the method further comprises instantiating, by the electronic device, at least a third virtual machine based on a vulnerable software profile;

processing suspicious content on at least the third virtual machine;

determining one or more exploits including the exploit if the suspicious content, upon execution within the third virtual machine, performs an undesired behavior.

3. The method of claim 2, wherein the second fortified software profile identifying at least the application updated with one or more security patches to address known, detected exploits targeted for the application, the one or more security patches being more recent than one or more security patches for at least the application associated with the first fortified software profile.

4. The method of claim 3, wherein the vulnerable software profile identifying the operating system or the application without security patches to address the known, detected exploits.

5. The method of claim 3, wherein at least the second fortified software profile identifying a type of the operating system and a version number of the operating system.

6. The method of claim 5, wherein at least the second fortified software profile further identifying one or more applications and a version number for each of the one or more applications.

7. The method of claim 1, wherein the determining of the plurality of fortified software profiles comprises using attributes of the exploit by the electronic device to formulate software profile information that is used by logic within the electronic device for selecting the first fortified software profile and the second fortified software profile.

8. The method of claim 1, wherein the update of the application in the second fortified software profile includes one or more security patches to address known, detected exploits targeted for the application.

9. The method of claim 1, wherein the first fortified software profile includes a first version of the operating system or a first version of the application and the second fortified software profile identifying a most recent version of the operating system updated to address known, detected exploits targeted for the operating system or a most recent version of the application updated to address known, detected exploits targeted for the application.

10. The method of claim 1, wherein the first virtual machine being based on the first fortified software profile associated with at least a first version of the operating system upgraded with one or more security patches directed to known exploits and the second virtual machine being based on the second fortified software profile associated with at least a second version of the operating system upgraded to address vulnerabilities exploited by the known exploits.

11. The method of claim 1, wherein the first fortified software profile includes at least one of the operating system or the application to which a security patch has been applied to address a vulnerability to a malicious attack.

12. The method of claim 1, wherein the weighting of each of the undesired behaviors is based on a likelihood of each of the undesired behaviors being associated with a system compromise.

13. The method of claim 1, wherein the determining that the exploit is associated with the zero-day attack comprises detecting (i) the weighted value associated with undesired behaviors during the processing of the content associated with the exploit on the first virtual machine exceeds the threshold value and (ii) the weighted value associated with undesired behaviors during the processing of the content associated with the exploit on the second virtual machine exceeds the threshold value.

14. The method of claim 1, wherein the weighting of each of the undesired behaviors is assigned based on a likelihood of the electronic device being compromised upon detecting the each of the undesired behaviors.

15. An electronic device, comprising:
a communication interface logic adapted to receive incoming content; and
one or more hardware processors in communication with the communication interface logic, the one or more hardware processors to
(i) determine a plurality of fortified software profiles for use in instantiating one or more virtual machines based on information associated with an exploit,
(ii) instantiate at least a first virtual machine of the one or more virtual machines based on a fortified software profile of the plurality of fortified software profiles and a second virtual machine of the one or more virtual machines based on a software profile different than the fortified software profile, wherein the software profile includes an operating system and one or more applications and the fortified software profile includes an update of the operating system or an update of the one or more applications;
(iii) control execution of content associated with the exploit on the first virtual machine and the second virtual machine, the execution of the content associated with the exploit being performed concurrently in which one or more of operations performed by the first virtual machine at least partially overlaps in time one or more operations performed by the second virtual machine;
(iv) determining undesired behaviors caused by the execution of the content associated with the exploit on both the first virtual machine and the second virtual machine;
(v) weighting each of the undesired behaviors, determined during the execution of the content associated with the exploit, to obtain a weighted value; and
(vi) determining that the exploit is associated with a zero-day attack responsive to the weighted value exceeds a threshold value.

16. The electronic device of claim 15, wherein the one or more hardware processors further instantiating a third virtual machine based on a vulnerable software profile, processing suspicious content on the third virtual machine, determining a presence of the exploit if the suspicious content, upon execution within the third virtual machine, performs an undesired behavior, and providing the content associated with the exploit to the first virtual machine and the second virtual machine.

17. The electronic device of claim 16, wherein the fortified software profile identifying at least one of (i) at least the one or more applications updated with one or more security patches to address known, detected exploits targeted for the one or more applications and (ii) a most recent version of the one or more applications updated to address known, detected exploits targeted for the one or more applications.

18. The electronic device of claim 17, wherein the fortified software profile identifying a type of the operating system and a version number of the operating system.

19. The electronic device of claim 18, wherein the fortified software profile further identifying the one or more applications and a version number for each of the one or more applications.

20. The electronic device of claim 17, wherein the vulnerable software profile identifying the operating system or the one or more applications without security patches to address known, detected exploits.

21. The electronic device of claim 15, wherein the incoming content is the content associated with the exploit.

22. The electronic device of claim 15, wherein the fortified software profile identifying either (a) a most recent version of the operating system updated to address known exploits targeted for the operating system and a most recent version of the one or more applications updated to address known exploits targeted for the one or more applications or (b) the operating system updated with one or more security patches to address already known exploits targeted for the operating system and the one or more applications updated with one or more security patches to address already known exploits targeted for the one or more applications.

23. The electronic device of claim 15, wherein the one or more hardware processors instantiating at least (1) the first virtual machine based on the fortified software profile associated with a first version of the operating system upgraded to address vulnerabilities exploited by previously known exploits and (2) the second virtual machine based on the software profile associated with a second version of the operating system upgraded to address vulnerabilities exploited by the previously known exploits.

24. The electronic device of claim 15, wherein the one or more hardware processors instantiating at least (a) the first virtual machine based on the fortified software profile associated with a first version of the one or more applications updated to address a first group of known exploits targeted for the one or more applications and (b) the second virtual machine based on the software profile associated with a second version of the one or more applications that is updated to address a second group of known exploits targeted for the one or more applications, the first group of known exploits being a subset of the second group of known exploits.

25. The electronic device of claim 15, wherein the one or more hardware processors further producing a security signature for subsequent detection of the exploit associated with the zero-day attack, the security signature includes at least one of a binary of the exploit and information associated with the undesired behaviors.

26. The electronic device of claim 15, wherein the fortified software profile includes at least one of (i) the update of the operating system including the operating system to which a security patch has been applied to address a vulnerability of the operating system to a malicious attack or (ii) the update of the one or more applications including the one or more applications to which a security patch has been applied to address a vulnerability of the one or more applications to a malicious attack.

27. The electronic device of claim 15, wherein the weighting of each of the undesired behaviors is based on a likelihood of each of the undesired behaviors being associated with a system compromise.

28. The electronic device of claim 15, wherein the determining that the exploit is associated with the zero-day attack comprises detecting (i) the weighted value associated with undesired behaviors during the processing of the content associated with the exploit on the first virtual machine exceeds the threshold value and (ii) the weighted value associated with undesired behaviors during the processing of the content associated with the exploit on the second virtual machine exceeds the threshold value.

29. The electronic device of claim 15, wherein the one or more hardware processors being further configured to assign the weighting of each of the undesired behaviors based on a likelihood of the electronic device being compromised upon detecting the each of the undesired behaviors.

30. The electronic device of claim 15, wherein the update of the operating system or the update of the one or more applications comprises a software patch being applied to the operating system or the one or more applications forming the fortified software profile.

31. A non-transitory storage medium to contain software that, when executed by one or more processors within an electronic device, performs operations comprising:
    receiving content associated with an exploit propagating over a transmission medium being part of a network;
    determining both a first software profile for a first virtual machine based on the content associated with the exploit and a second software profile for a second virtual machine based on the content associated with the exploit, the first software profile includes an operating system and at least one application and the second software profile includes an update of the operating system or an update of the at least one application;
    instantiating, by the one or more processors, the first virtual machine based on the first software profile;
    instantiating, by the one or more processors, the second virtual machine based on the second software profile;
    processing the content associated with the exploit on both the first virtual machine and the second virtual machine, the processing of the content associated with the exploit being performed concurrently in which one or more of operations performed by the first virtual machine at least partially overlaps in time one or more operations performed by the second virtual machine;
    determining, by the one or more processors, undesired behaviors during the processing of the content associated with the exploit on both the first virtual machine and the second virtual machine;
    weighting, by the one or more processors, each of the undesired behaviors determined during the processing of the content associated with the exploit, to obtain a weighted value; and
    determining that the exploit is associated with a zero-day attack responsive to the weighted value exceeds a threshold value.

32. The non-transitory storage medium of claim 31, wherein the first software profile and the second software profile identifying the at least one application updated with one or more security patches to address known exploits targeted for the at least one application.

33. The non-transitory storage medium of claim 32, wherein the first software profile identifying the at least one application and the second software profile identifying the at least one application updated with one or more security patches to address known exploits targeted for the at least one application.

34. The non-transitory storage medium of claim 31, wherein the first software profile is a version of the operating system or a first version of the at least one application and the second software profile identifying a most recent version of the operating system updated to address known exploits targeted for the operating system or a most recent version of the at least one application updated to address known exploits targeted for the at least one application.

35. The non-transitory storage medium of claim 31, wherein the second software profile identifying the at least one application updated with one or more security patches to address known exploits targeted for the at least one application, the one or more security patches being more recent than one or more security patches for the at least one application associated with the first software profile.

36. The non-transitory storage medium of claim 31, wherein the second software profile includes at least one of (i) the update of the operating system including the operating system to which a security patch has been applied to address a vulnerability of the operating system to a malicious attack or (ii) the update of the at least one application including the at least one application to which a security patch has been applied to address a vulnerability of the at least one application to a malicious attack.

37. The non-transitory storage medium of claim 31, wherein the weighting of each of the undesired behaviors is based on a likelihood of each of the undesired behaviors being associated with a system compromise.

38. The non-transitory storage medium of claim 31, wherein the determining that the exploit is associated with the zero-day attack comprises detecting (i) the weighted value associated with undesired behaviors during the processing of the content associated with the exploit on the first virtual machine exceeds the threshold value and (ii) the weighted value associated with undesired behaviors during the processing of the content associated with the exploit on the second virtual machine exceeds the threshold value.

39. The non-transitory storage medium of claim 31, wherein the weighting of each of the undesired behaviors is assigned based on a likelihood of the electronic device being compromised upon detecting the each of the undesired behaviors.

40. A method for determining a zero-day attack by an electronic device, comprising:
  determining a plurality of fortified software profiles for use in instantiating one or more virtual machines based on information associated with an exploit;
  instantiating, by the electronic device, a first virtual machine of the one or more virtual machines based on a first fortified software profile of the plurality of fortified software profiles that includes an update of an operating system and an update of at least one application and a second virtual machine of the one or more of virtual machines based on a second fortified software profile of the plurality of fortified software profiles that is different from the first fortified software profile and the second fortified software profile includes an update of the updated operating system of the first fortified software profile or an update of the updated application of the first fortified software profile;
  processing content associated with the exploit on both the first virtual machine and the second virtual machine, the processing of the content associated with the exploit being performed concurrently in which one or more of operations performed by the first virtual machine at least partially overlaps in time one or more operations performed by the second virtual machine;
  determining, by the electronic device, undesired behaviors during the processing of the content associated with the exploit on both the first virtual machine and the second virtual machine
  weighting, by the electronic device, each of the undesired behaviors determined during the processing of the content associated with the exploit, to obtain a weighted value; and
  determining, by the electronic device, that the exploit is associated with the zero-day attack responsive to the weighted value exceeds a threshold value.

41. The method of claim 40, wherein the first fortified software profile includes at least one of (i) the update of the operating system including the operating system to which a security patch has been applied to address a vulnerability of the operating system to a malicious attack or (ii) the update of the at least one application including the at least one application to which a security patch has been applied to address a vulnerability of the at least one application to a malicious attack.

42. The method of claim 40, wherein the weighting of each of the undesired behaviors is based on a likelihood of each of the undesired behaviors being associated with a system compromise.

43. The method of claim 40, wherein the determining that the exploit is associated with the zero-day attack comprises detecting (i) the weighted value associated with undesired behaviors during the processing of the content associated with the exploit on the first virtual machine exceeds the threshold value and (ii) the weighted value associated with undesired behaviors during the processing of the content associated with the exploit on the second virtual machine exceeds the threshold value.

44. The method of claim 40, wherein the weighting of each of the undesired behaviors is assigned based on a likelihood of the electronic device being compromised upon detecting the each of the undesired behaviors.

* * * * *